United States Patent Office 3,819,791
Patented June 25, 1974

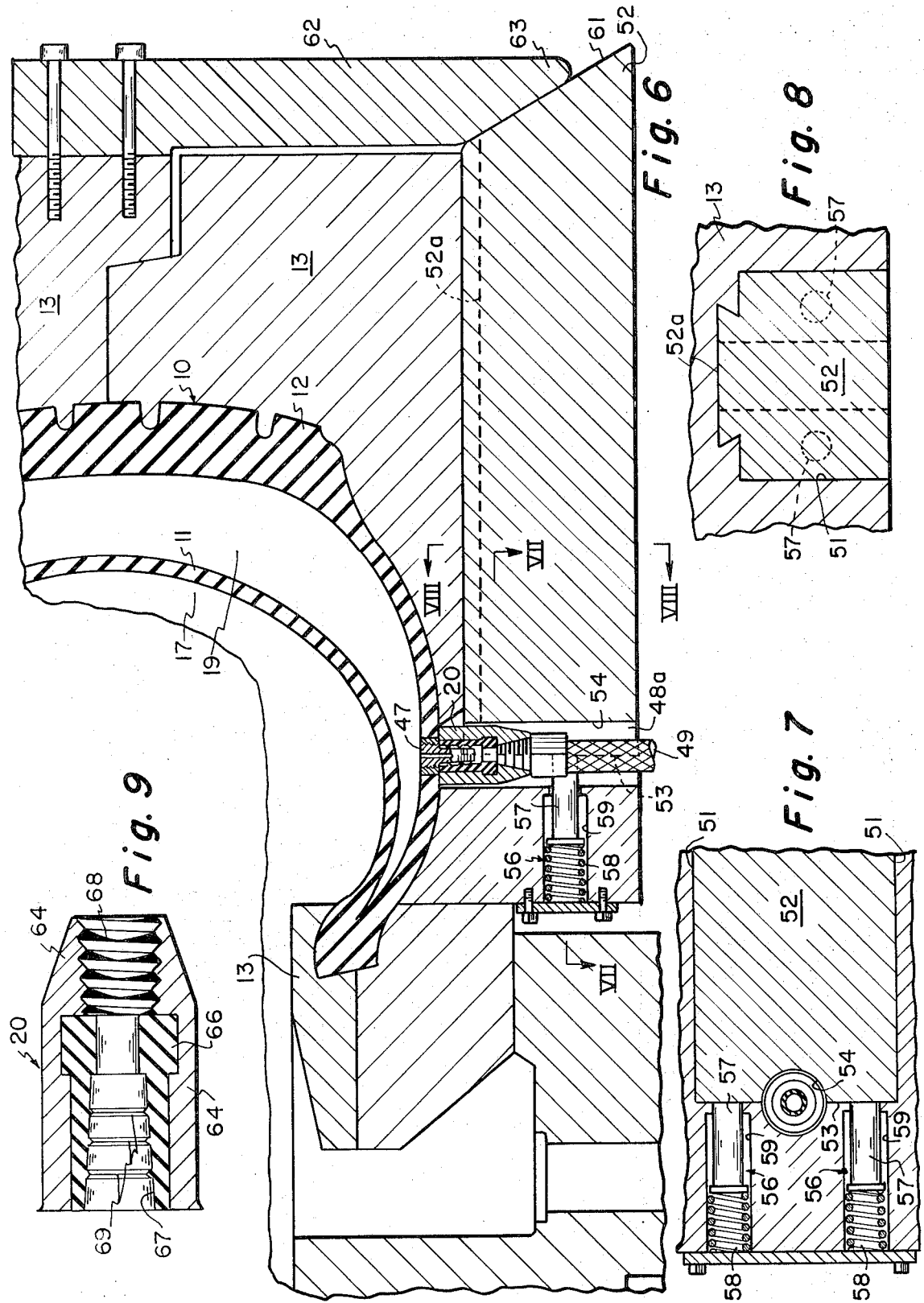

---

3,819,791
METHOD FOR SINGLE STAGE CURING OF INTE-GRATED DUAL CHAMBERED SAFETY TIRES
Myron T. Ayers, Akron, Ohio, assignor to The General Tire & Rubber Company
Filed Sept. 25, 1972, Ser. No. 292,207
Int. Cl. B29h 5/02, 15/02
U.S. Cl. 264—94                6 Claims

ABSTRACT OF THE DISCLOSURE

Method for the single stage curing of integrated dual chamber safety tires. A tire is placed in a mold and the outer chamber of the tire is pressurized with a curing fluid at a pressure of from about 1 to 10 p.s.i. less than the pressure within a bladder inflated within the inner chamber. The tire is expanded against the mold and cured therein.

FIELD OF THE INVENTION

The present invention relates to a method for curing or vulcanizing an integrated dual chambered tire.

BACKGROUND OF THE INVENTION

Pneumatic dual chambered vehicle safety tires are generally well known in the art. Illustrative of such tires as well as methods for their manufacture are U.S. Pat. Nos. 3,034,557, 3,110,339 and 3,487,870.

In the construction of dual chambered tires, the spacing or separation between the inner and outer tire members is particularly critical. The inner tire member must be spaced a sufficient distance from the outer tire to permit the tire to deflect without the members contacting each other. Furthermore, the inner tire must be adequately spaced from the rim to allow a sufficient volume of air to be contained within the inner chamber. Because of the problems inherent in attaining the critical spacing or separation during manufacture the conventional dual chambered tire has generally comprised two tires with structurally distinct members, mounted as a unit on the rim. Attempts to make the two members as a single unit have not been generally successful.

One approach to the integrated or unitized dual chambered tire has been disclosed in U.S. Pat. No. 3,004,579, assigned to the present assignee. While the tire disclosed therein and the method for its manufacture have been successful, the success has been largely because of its high "aspect-ratio." Current emphasis is on the "low profile" tire which necessitates a new approach to the dual chambered tire. Such a tire is the basis of U.S. Application Ser. No. 228,151, filed Feb. 22, 1972 and assigned to the present assignee. Disclosed therein is a dual chambered tire comprising an inner tire member of bias ply carcass construction and an outer tire member of radial ply carcass construction.

The method disclosed in application Ser. No. 228,151 for constructing the dual chamber low profile tire is a single stage process. By making the tire on a single drum, obvious production advantages are achieved. Moreover, in the construction of dual chambered tires and, in particular those having a bias inner member and a radial outer member, it is also highly desirable to be able to vulcanize or cure the "green" tire in a single stage. In application Ser. No. 228,151 methods of curing the dual chamber after single stage construction were left to those skilled in the art.

In prior attempts to vulcanize an integrally made dual chamber tire, it was necessary to take a substantially vulcanized tire from its mold, and, while still hot, place it on a forming rim to separate the chambers to achieve the critical spacing. While satisfactory results were obtained, the two step operation did not lend itself to economical high speed production. Accordingly, a need exists for a single step process for vulcanizing or curing integrated dual chamber tires.

SUMMARY OF THE INVENTION

The present invention is addressed to a method for curing an integrated dual chamber tire in a single step. The method of the present invention advantageously utilize the sidewall inflation valve of the outer chamber to provide a single stage curing of dual chamber tires.

As is the general procedure, the dual chambered tire, such as that for example disclosed in Ser. No. 228,151, filed Feb. 22, 1972, in the "green" state is placed into a curing mold heated to a temperature of about 300 to 330° F. The mold includes an inflatable bladder which is adapted to expand the tire against the mold walls by the pressurized introduction of a curing fluid. In the present invention, curing fluid is simultaneously introduced into the chamber between the inner and outer tire members through, preferably, the sidewall inflation valve to said chamber as the bladder is inflated. A pressure differential is maintained between the chamber and bladder fluids. Preferably, the pressure in the bladder is maintained slightly greater than that in the chamber, for example, 10 p.s.i. However, a pressure differential of from 1 to 2 p.s.i. is sufficient.

Variations in the operating parameters of the single stage curing method of the present invention of dual chambered tires confirmed the desirability of maintaining the bladder pressure slightly higher than that of the chamber. Where no pressure differential exists between the bladder and chamber, the critical spacing between inner and outer members is not satisfactorily achieved. Where the chamber is maintained at a pressure above that in the bladder, the inner member is usually forced back inside the bead diameter. Conversely by increasing the differential in the bladder more than about 10 p.s.i. in the chamber, for example, to 15 p.s.i., satisfactory spacing between the inner and outer members is not uniformly achieved.

Moreover, by utilizing the same curing fluid for both the chamber and bladder, more uniform spacing was accomplished than when different fluids are used such as a combination of steam and air. Preferably, steam is used as the curing media for both the chamber and bladder.

Accordingly, the preferred method includes introducing steam to both the bladder and chamber, simultaneously, and maintaining during that introduction a pressure within the bladder about 4–6 p.s.i. higher than the chamber. The respective final pressures are about 140 p.s.i. and 135 p.s.i. The pressurized fluid is maintained within the chamber for about 15–20 minutes at which time it is drained from the chamber, and cold water, under pressure, is thereafter admitted to the chamber. Both the chamber and bladder are then evacuated by means of a vacuum and the mold is opened.

In addition to the problem of achieving the critical separation between the inner and outer tire, it was discovered that it is important to maintain proper alignment of the chamber sidewall valve during placement of the tire in the mold as well as during curing. When the tire is placed in the mold, a connection is made between the sidewall valve and a line through an opening in the mold to a controlled source of curing fluid. After the connection is made and during its complete insertion into the mold, the connection has a proclivity to twist which places force on the valve stem. Since the sidewall valve is made of brass and is held in place by weak uncured rubber bonding, these forces provide a further weakening of that bond as well as leaks in the resulting cured tire at the valve stem interface.

In order to overcome the problem, the present invention provides an adapter means for connecting the valve stem to a controlled source of curing fluid. The adapter means includes an adapter having a gasket for making a fluid tight connection between the valve stem and a flexible conduit which passes through an opening in the mold. The opening in the valve becomes progressively wider from the inner mold-face to the outside of the mold. The progressive widening of the mold opening permits the adapter and flexible cable to assume an approximately 90° angle with the sidewall of the tire during the placement of the tire in the mold. The flexible conduit and adapter are movable within the opening without distributing or transmitting forces to the valve stem.

Thus, by utilizing the adapter means in connection with the method of the present invention, tires having an integrated dual chamber were consistently cured with the critical separation and without weakening of the valve stem-sidewall bond.

Other advantages of the present invention will become apparent to those skilled in the art upon a perusal of the following detailed description taken in connection with the accompanying drawings.

BRIEF DESCRIPTION OF THE DRAWINGS

FIG. 6 is a partial elevation view partially in section of an embodiment of the present invention for positively aligning the adapter means during mold closing;

FIG. 7 is a section view taken along line VII—VII of FIG. 6;

FIG. 8 is a section view taken along line VIII—VIII of FIG. 6; and

FIG. 9 is a section view of the adapter means of the present invention.

PRESENTLY PREFERRED EMBODIMENT

Figure 1:
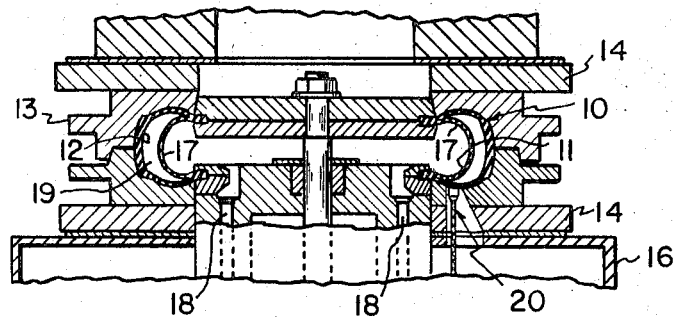
FIG. 1 is an elevation view in cross-section af a dual chambered tire curing mold for use in the method of the present invention.
Figure 2:
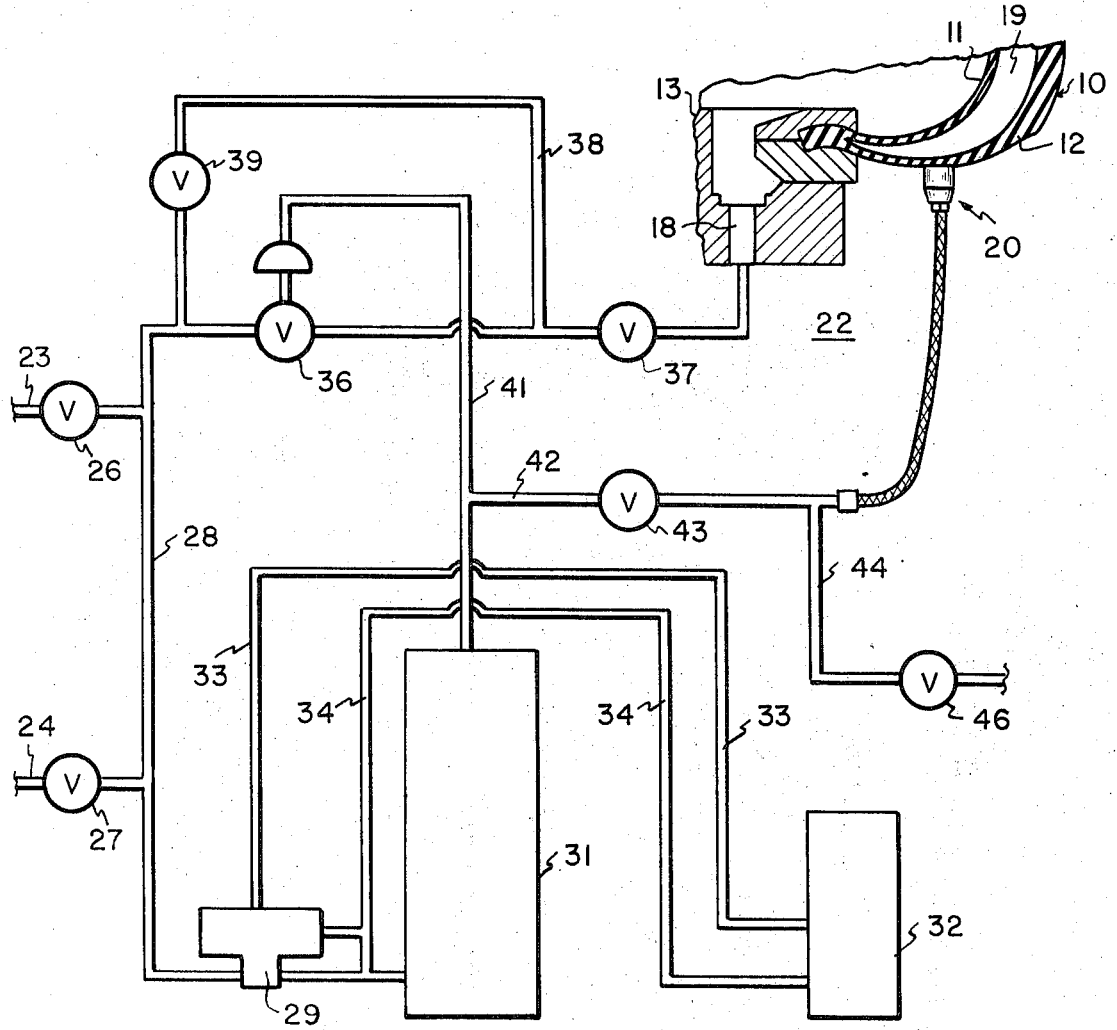
FIG. 2 is a simplified schematic of the means for controllably supplying curing fluid to a dual chambered tire.

Referring to FIGS. 1 and 2, the presently preferred method of the invention includes placing an integrated dual chamber tire 10 having an inner member 11 and an outer member 12 into a mold 13. The mold is parted along the center line of tire 10 and includes a platen 14 and pressure floor 16. Mold 13 is generally adapted to heat tire 10 to a temperature of about 330° F., and includes an annular bladder 17 adapted to abut the inner member 11 when filled with a pressurized curing fluid. Annular bladder 17 is in communication with a source of pressurized curing fluid by means of annular passageway 18. Chamber 19, formed between inner and outer members 11 and 12, respectively, is connected to a source of pressurized curing fluid by means of an adapter means 20, described more fully hereinafter.

As shown in FIG. 2, adapter means 20 and passageway 18 are connected to a source of pressurized curing fluid through control system 22. Control system 22 includes a pair of lines 23 and 24, each connected to a different source of curing fluid, for example line 23 is connected to a steam source while line 24 is connected to a pressurized air source. Since the preferred method includes the utilization of the same curing fluid into both the bladder 17 and chamber 19, lines 23 and 24 include shut-off valves 26 and 27, respectively, for controllably introducing only one curing fluid into system 22 at a time. Lines 23 and 24 are connected to line 28 which at one of its ends is connected through a pressure control valve 29 into pressure storage tank 31. A load cell 32 is connected to pressure control valve 29 by means of lines 33 and 34. Line 34 is additionally connected to line 28 between valve 29 and tank 31 to sense the pressure of the fluid entering tank 31. Load cell 32 thus controls, through regulation of control valve 29 the pressure of the fluid stored in tank 31.

The other end of line 28 is connected to bladder 17 through a Fischer governor valve 36 and diaphragm valve 37 and annular passageway 18 of mold 13. Diaphragm valve 37 is connected to mold 13 to open only when the mold has been sealed closed. A bypass line 38 and shut-off valve 39 is provided around governor valve 36. Governor valve 36 is connected to tank 31 by means of line 41 to sense the pressure in tank 31 and open valve 36 to permit an equal amount of pressure to pass therethrough as tank 31. Valve 35 can also be preset to permit a predetermined increase or decrease in pressure over that established in tank 31 to pass through valve 36. Thus, by presetting governor valve 36 to permit an increase of from 4–6 p.s.i., valve 36 will permit curing fluid to flow to bladder 17 under a pressure equal to that in tank 31, plus the additional 4–6 p.s.i. of preset pressure. Line 42 is connected between line 41 from tank 31 and to chamber 19 through diaphragm valve 43 and adapter means 20. Diaphragm valve 43 can be connected to mold 13 to open only when the mold is sealed closed. Line 42 additionally includes an exhaust line 44 and shut-off valve 46 for exhausting chamber 19 of curing fluid and introducing cooling fluid.

While the apparatus of the preferred embodiment is adapted for utilizing the same curing fluid in both bladder 17 and chamber 19, it is clear that it could be modified to introduce air into the chamber while simultaneously introducing steam into the bladder. Such apparatus would preferably utilize a pair of tanks and load cells to control the pressure of the respective fluids into the chamber and bladder. However, since utilization of the same fluid provides more uniform results, the simultaneous use of different curing fluids is not preferred.

Utilizing the apparatus described above as well as adapter means 20 described below, tires were consistently cured having the desired separation between inner and outer members 11 and 12. The preferred method includes the following cure cycle:

Exhaust valve 46 is closed and supply valve 26 is opened to permit the introduction of steam to control system 22. Pressure differential of the governor valve 36 is maintained at a positive 4 to 6 p.s.i., and 5 p.s.i. of steam is introduced to bladder 17. The pressures are built up in chamber 19 to approximately 135 p.s.i. and in bladder 17 to approximately 140 p.s.i. in about 4 minutes. It should be noted that greater pressure can be utilized, e.g. 180 and 185 p.s.i., with corresponding reduction in cure times. For example, at 135 p.s.i. the temperature of the steam is 358° F., at 140 p.s.i. the temperature is 361° F., and at 185 p.s.i. the temperature is 382° F. After about 16 minutes valve 46 is opened and the supply to chamber 19 is stopped by closing valve 43 to reduce the steam pressure in chamber 19 to zero. Chamber 19 is filled with cold water through exhaust line 44 at 60 to 80 p.s.i. for about 1 minute. The cold water is stopped and a high vacuum is applied to chamber 19, and thereafter to bladder 17. The vacuums are released and the mold 13 opened. The platen 14 is preferably at a temperature of about 330° F. and the complete cure cycle lasts approximately 23½ minutes.

Figure 3:
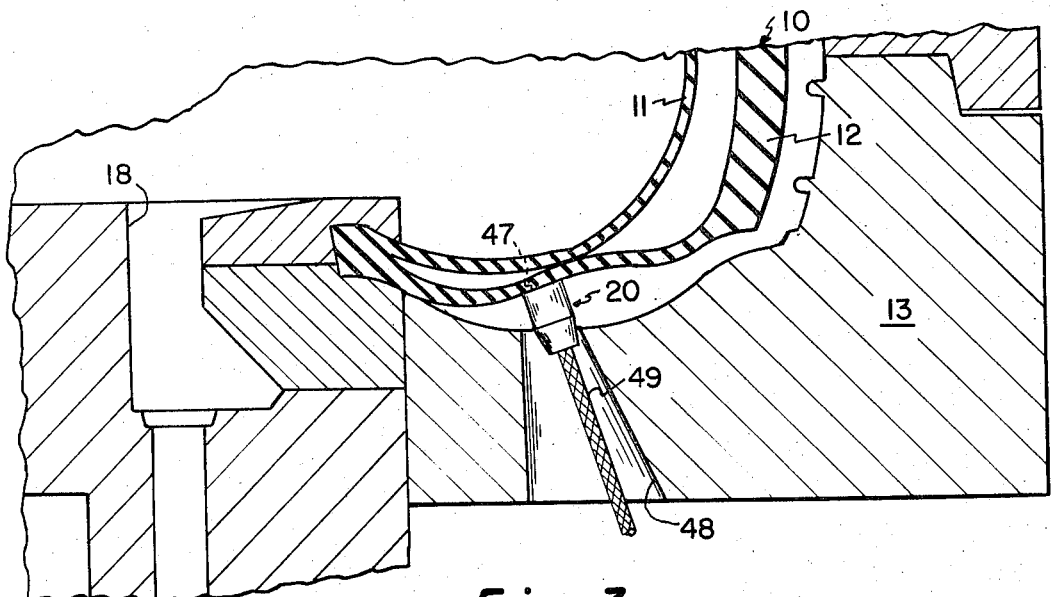
FIG. 3 is a partial elevation view in cross-section of a tire as it is inserted into a mold and the adapter means of the present invention.

Referring to FIG. 3, in connecting line 42 to chamber 19 through valve stem 47 sidewall leakage problems must be overcome. Valve stem 47 is usually made of brass and bonded with the uncured tire sidewall rubber. The bond between the brass stem and rubber is, however, weak. Therefore, it is necessary that adapter means 20, including the opening through mold 13, must permit the connection to maintain a substantially normal or perpendicular engagement throughout the placement of the tire in the mold as well as during the introduction of curing fluid. As can be seen from FIG. 3, as the tire is initially placed in mold 13, the angle of the adapter means 20 including a flexible conduit 49, with respect to the sidewall and mold opening is different from that when the tire is fully inserted into the mold and/or when curing fluid is introduced to force the carcass against the mold faces (see FIG. 4).

Figure 4:
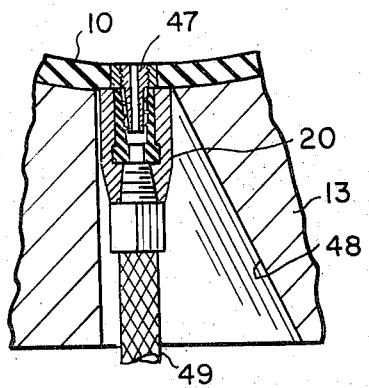
FIG. 4 is a partial elevation view of the relation between the adapter means and the tire sidewall when fully inserted in the mold.
Figure 5:
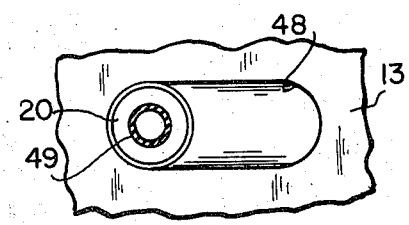
FIG. 5 is a plan view of the opening through the mold.

Accordingly, adapter means 20 includes an opening 48 in mold 13 having a progressively wider opening at the outside base of the mold from the inner mold-face. Preferably opening 48 is oblong (see FIGS. 4 and 5) at the outside of the mold and substantially circular at the mold-face. Moreover, it is preferred that the opening wall at the inner portion of the mold be substantially perpendicular to the axial center line of the mold while the outer wall of the opening be offset at an angle of about 45° to the axial center line of the mold. This permits flexible line 49 used to connect line 42 with chamber 19 to assume the angle of repose generally shown by FIG. 3 when the tire is being inserted into the mold. Thereafter, as the tire mold is closed upon the uncured tire, the angle can change as shown in FIG. 4 while permitting the connection between the line 49 and valve 47 to approach and maintain a substantially perpendicular relationship to the tire sidewall.

Referring to FIGS. 6-8, a means for maintaining the desired relationship between the line 49 and valve 47 during closing of the molds is shown. An opening 48a in mold 13 is provided having the same configuration as that shown in FIGS. 3-5. However, to properly ensure the desired relationship after mold 13 is closed, as well as during closing, a channel 51 is provided in mold 13 extending perpendicularly between opening 48a and the outer perimeter of mold 13. Slidably mounted within passageway 51 is a keyed member 52 having a key 52a. Member 52 is provided at its inner end with a substantially perpendicular end wall 53 having a flute 54 adapted to engage line 49 when mold 13 is closed. End wall 53 further includes a pair of biasing means 56 comprising a pair of pins 57 and springs 58. Preferably pins 57 abut member 52 and springs 58 are mounted within openings 59 in mold 13. Biasing means 56 is thus adapted to urge member 52 outwardly from the center of the mold. The outer end 61 of member 52 is angularly offset to provide planar incline.

Attached to the upper half of mold 13 is depending member 62 extending to at least about the center portion of member 52 when mold 13 is closed. Depending member 62 includes an end portion 63 angularly offset to provide a planar incline adapted to cooperatively engage end 61 of member 52.

Thus when mold 13 is open, biasing means 56 outwardly urges member 52 to fully open opening 48a. As the mold is closed end members 61 and 63 cooperatively engage each other to force member 52 against biasing means 56. As the mold 13 is closed, opening 48a is effectively defined by flute 54 so as to form an effectively perpendicular, circular opening 48a. Thus, line 49 is maintained with valve 47 in a substantially normal relationship to the sidewall during closing of mold 13.

To assure proper connection between conduit 49 and valve 47, an adapter member 64 having an insert gasket 66 is provided. Adapter member 64 includes a threaded opening 68 for connection to line 49. Gasket 66 is adapted to fit within adapter member 64 and includes a receiving opening 67 preferably being progressively narrower from its mouth to an intermediate portion for engagingly receiving valve 47. Gasket 66 is preferably made of an elastomeric material, such as synthetic rubber or the like, and preferably includes projections 69 extending preferably about $\frac{1}{32}''$ into opening 67 to provide an effective seal between valve 47 and line 49.

Thus, by utilizing the adapter means of the present invention including the progressively widening mold opening with the method of the invention, integrated dual chambered tires of very high quality can be successfully cured in a single stage.

While preferred embodiments of the invention have been particularly shown and described, it may otherwise be embodied within the scope of the appended claims.

What is claimed is:

1. A method for single stage curing of integrated dual chamber tires which have an inner and outer member between which is an outer chamber, said method comprising:
    (A) placing the tire in a curing mold having shaped cavity walls and an expandable bladder for expanding the inner member;
    (B) introducing a curing fluid into said bladder and simultaneously therewith introducing a curing fluid into said outer chamber at a pressure of from about 1 to 10 p.s.i. less than said pressure introduced to said bladder to expand said outer member against said cavity walls;
    (C) maintaining said respective pressures during curing of the tire; and
    (D) evacuating said fluids from said chamber and said bladder and removing the cured tire from the mold.

2. A method as set forth in claim 1 wherein said pressure differential during introduction and maintenance is from about 4 to 6 p.s.i.

3. A method as set forth in claim 1 wherein said curing fluid in introduced into the chamber simultaneously with introduction into said bladder but after said bladder has reached a pressure of from 4 to 6 p.s.i.

4. A method as set forth in claim 1 wherein the curing fluid is selected from the group consisting of steam and air.

5. A method as set forth in claim 1 wherein the curing fluid introduced is the same for both the chamber and the bladder.

6. A method as set forth in claim 5 wherein said curing fluid is steam.

References Cited

UNITED STATES PATENTS 3,004,579  10/1961  Hutch _____ 156—119 XR
3,110,339  11/1963  Fickel _____ 152—339

JAN H. SILBAUGH, Primary Examiner

U.S. Cl. X.R.

156—119; 264—315; 425—45